Patented Feb. 1, 1944

2,340,652

UNITED STATES PATENT OFFICE 2,340,652

MANUFACTURE OF POLYAMIDE STRUCTURES

Orrington Embry Dwyer, Rochester, N. Y., assignor to E. I. du Pont de Nemours & Company, Wilmington, Del., a corporation of Delaware No Drawing. Application April 25, 1942, Serial No. 440,482

18 Claims. (Cl. 18—57)

This invention relates to the production of improved transparent synthetic linear polyamide articles. For convenience, the invention will be discussed with particular reference to the production of transparent synthetic linear polyamide sheets and films. It is to be understood, however, that the invention is not so limited.

The production of transparent synthetic linear polyamide sheets and films has been known prior to the present invention; however, such previously known processes have certain disadvantages. For example, the production of transparent synthetic linear polyamide films by a process of melt casting is disclosed in Foster U. S. Patent No. 2,212,770. The melt casting of films of any substantial width, however, presents innumerable problems. Difficulties have consequently been encountered in the commercial exploitation of such a process.

The copending application of Orion E. Schupp, Jr., Serial No. 362,660, filed October 24, 1940, discloses a method of dissolving synthetic linear polyamides in solutions of metal salts in alcohols. Such solutions can be readily used for the extrusion and casting of films and sheets. However, by the casting of sheets and films in accordance with the above-identified Schupp process, extruded or cast sheets and films will be opaque in nature. For certain purposes, it is highly desirable that films and sheets composed of synthetic linear polyamides be clear and transparent.

It is therefore an object of the present invention to provide a method of producing transparent articles, particularly sheets and films, from metal salt-alcohol solutions of synthetic linear polyamides.

Other objects of the invention will appear hereinafter.

By the term, "synthetic linear polyamides," as used throughout the specification and claims, is meant synthetic linear polyamides of the types described in U. S. Patents, Nos. 2,071,250, 2,071,- 253 and 2,130,948. These polyamides contain amide groups

where R is hydrogen or a monovalent hydrocarbon radical) as an integral part of the main chain of atoms in the polymer. Further, the average number of carbon atoms in the segments of the chain separating the amide groups in these polyamides is at least two.

In accordance with the present invention, transparent articles can be produced from metal salt-alcohol solutions of a synthetic linear polyamide by dissolving a synthetic linear polyamide having a quench index above 125 mils in a solution taken from the group consisting of metal salt-methanol and metal salt-ethanol solutions, forming an article from said solution, evaporating substantially all of the alcohol from the formed article at a rate sufficiently slow to prevent the formation of bubbles therein and before the article comes into contact with water or an atmosphere having a relative humidity above 50%, then washing the metal salt from the article with water having a temperature not to exceed 40° C. and finally drying the article.

The following specific examples illustrate certain preferred methods for carrying out the present invention, it being understood that the invention is not to be limited to the details set forth in these examples.

Example I

Five hundred parts of an interpolymer prepared from hexamethylene diammonium adipate and hexamethylene diammonium sebacate in the proportion of 30% of the former and 70% of the latter are dissolved in a solution comprising 500 parts of calcium chloride and 1500 parts of methanol. The calcium chloride used in the solution was first fused to remove all water therefrom and the methanol used in the solution was first dehydrated by distilling the same over magnesium metal. A glass plate is coated with a quantity of the solution and excess solution is removed by means of a doctor knife. The coating is carried out while the glass is heated to a temperature of approximately 50° C. and the surrounding atmosphere is similarly heated with air having a relative humidity of 5%. The temperature of the glass plate and the surrounding atmosphere is maintained at 50° C. for a period of about 10 minutes and the temperature of the plate and the surrounding atmosphere is then raised to 100° C. The plate and coating is heated at 100° C. for sufficient time for the removal of substantially all of the methanol. The above method of exposing the plate and coating to heated air will avoid too rapid evaporation of the methanol and thereby prevent formation of bubbles in the film. The film is glass clear and is washed in water having a temperature of 18° C. until substantially all of the calcium chloride has been removed. The film is then removed from the glass plate. The still glass clear film is dried under a slight tension (sufficient tension to prevent shrinkage and wrinkling of the film). The resulting film is glass clear and has very satisfactory physical properties.

*Example II*

A polyamide-metal salt-methanol solution is prepared similarly to the method outlined in Example I except that the methanol is the commercial grade of synthetic methanol containing approximately 0.5% water. The glass clear film is prepared in the same manner as set forth in Example I except that the calcium chloride is removed from the film by washing the same in water having a temperature of 0° C. The resulting film has the same glass clear transparency and good physical characteristics of the film obtained by the process of Example I.

*Example III*

Five hundred parts of an interpolymer prepared from hexamethylene diammonium adipate, hexamethylene diammonium sebacate, and caprolactam, the proportions of these ingredients in the ratio of 40 parts to 30 parts to 30 parts, respectively, are dissolved in a solvent comprising 2500 parts of calcium chloride and methanol. The calcium chloride constituted 5% of the methanol-calcium chloride solution. The polyamide solution is coated on a glass plate and processed in the manner set forth in Example I. A glass clear film having desirable physical characteristics is thereby obtained.

For the production of transparent synthetic linear polyamide articles in accordance with the present invention, it is preferred to use an interpolyamide prepared from hexamethylene diammonium adipate and hexamethylene diammonium sebacate, preferably in the proportion of 30% of the former and 70% of the latter. It is nevertheless possible to use interpolymers containing the above two ingredients in a range between 15% of the former and 85% of the latter to 45% of the former and 55% of the latter. The above range represents the most readily meltable interpolymers which can be prepared from the above two compounds.

Although the above-named interpolyers are particularly useful for the purpose of the present invention, it is within the scope of the invention to use any synthetic linear polyamide including synthetic linear interpolyamides provided that the polyamide has a quench index above 125 mils, and provided that it is film-forming or fiber-forming in character and that it is soluble in a metal salt-alcohol system of the type disclosed in the above-identified Schupp application. Whether a synthetic linear polyamide has a quench index of above 125 mils can be determined in the following manner:

Sheet aluminum of 0.008 inch thickness is wrapped around a steel wedge having a width of approximately 1⅛ inches, a length of approximately 8 inches and an included angle of 2.5°. The seams of the aluminum sheet are locked and hammered so that a water-tight mold is constructed. This mold is filled with flakes of the synthetic linear polyamide to be tested, and the mold is placed in a test tube which is evacuated and heated by positioning the same within a bath of diphenylene oxide vapor for 60 minutes to melt the polyamide. The vacuum line to the test tube is then closed and carbon dioxide is slowly admitted to the tube. Twenty seconds after shutting off the vacuum, the wedge is quenched by dropping it into a mass of water having a temperature of 0° C. The aluminum is then dissolved from the nylon, for example, by means of sodium hydroxide solution. It is found that the polyamide at the tip of the mold and for some distance upward is transparent because of rapid quenching. The quenching properties of the polyamide determine how much of the wedge will be clear and how much will be cloudy or opaque because of crystallization. The line of demarcation between clear and cloudy polyamide can be easily seen and marked with ink. The thickness of the wedge at various points along this line is measured, in mils, with a micrometer. An average of four such measurements is usually sufficient and is taken as the quench index of the polyamide. The quench index of a given polyamide can be reproduced within about ±5% of a given value.

*Example IV*

A polyamide-metal salt-methanol solution is prepared similarly to the method outlined in Example I. The polyamide solution is cast from a hopper through a narrow slit on to a metal casting belt. The belt carrying the polyamide passes into a heated zone where the temperature of the air surrounding the belt increases progressively from 50° C. to 100° C. in the direction of movement of the belt. The speed of the belt is such that the film, when it reaches the end of the heating zone, will be substantially free from methanol. The film on the belt is then subjected to washing by means of a countercurrent flow of water having a temperature of 9° C. to remove the salt from the film. The film on the belt is then subjected to drying by passing it into a second drying zone to remove substantially all of the water therefrom. The dried film is then stripped from the belt and wound on a support in a conventional manner. The resulting film has the same glass clear transparency and good physical characteristics of the film obtained by the process of Example I.

Reference is made in the examples to the substantially complete removal of the methanol before the film is contacted with water or an atmosphere having a high relative humidity. It is preferred that the film be heated until substantially all of the methanol is removed before the film contacts water or atmosphere having a relative humidity in excess of 50%. The sufficiency of the removal of the methanol to insure production of a transparent film may be readily determined in an empirical manner for a given set of evaporating conditions. For example, test samples may be taken from the film after various intervals of time exposure, for example, 1, 2, 5, 10, 20, 30 or 60 minutes after exposure to a certain set of evaporating conditions, and these test samples washed and dried to observe transparency of the film.

In the above examples, specific reference was made to the use of synthetic linear polyamides dissolved in calcium chloride-methanol solvents. Numerous other metal salt-methanol and metal salt-ethanol solvents may be used in the same manner. The above-identified Schupp application discloses other metal salts which may be used as equivalents for calcium chloride. For example, zinc, magnesium, lithium, strontium, aluminum, titanium, bismuth, cobalt and iron, bromides, iodides, nitrates and thiocyanates may be used. The only alcohols suitable for use in accordance with the present invention are methanol and ethanol. The concentration of polymer in the solvent may vary between wide limits. It is only necessary that the solution may be coated to produce a film or may be spun to form a thread, or formed in the shape of other articles. It is desirable, however, to use solutions comprising from 10% to 35%, and preferably from 15% to 25%, of the polyamide, and it is also preferred that the metal salt concentration used be that which will give substantially the highest concentration of polymer in the solution. In preparing the polyamide solutions, it is preferred that the metal salt and alcohol be substantially free of water. This is not essential however. The polyamide solution may contain up to 2% and possibly 3% water without preventing the formation of a transparent film in accordance with the process of the present invention.

Although it is preferable because of ease of operation to remove the alcohol as completely as possible prior to the first contact of the film with moisture, nevertheless, film of good clarity can be obtained even though traces of the alcohol are still present in the film at the time of washing. If slight traces of alcohol are present in the film, it is preferred that the film be quenched with water having a temperature between 10° C. and the freezing point of the wash water. Thereafter, it may be washed with water at temperatures as high as 40° C. If the film is heated to a temperature above about 50° C. prior to the washing step, it is preferred that the film be first cooled to a temperature of about 25° C. to 35° C. before washing the same in wash water at about 25° C. or less for removal of the metal salt.

As stated above, it is highly desirable to evaporate the alcohol from the formed article at a rate sufficiently slow to prevent the formation of bubbles therein. This is particularly true where it is desirable to have a glass clear transparent article since the formation of bubbles in an article by reason of excessively high rate of evaporation will cause the film to be hazy or even opaque.

It is furthermore desirable to remove substantially all of the alcohol before the article comes into contact with water or an atmosphere having a relative humidity above 50%, in other words, before the article comes into contact with moisture in greater concentration than an atmosphere having a relative humidity above 50%. Heretofore, it has been considered desirable to first wash the metal salt from the article while appreciable quantities of alcohol are still present in the article and then dry the article and thereby remove the quantities of alcohol remaining therein. By this procedure, however, it is found that transparent articles will not be produced. It is, therefore, highly important that the alcohol be substantially completely removed from the article before contacting the same with moisture. By the term "substantially completely removed" it is meant that no more than slight traces of alcohol remain in the article.

With regard to the tension used during the drying of film, or similar articles, there is no objection to applying considerable tension to the film. It is important, however, that the film be held sufficiently taut to prevent the formation of wrinkles therein which would normally be caused by drying a film in a relaxed condition.

For convenience, this invention has been discussed with particular reference to the production of sheets or films. It is to be clearly understood, however, that the invention is not limited to the production of sheets or films, and that equally desirable results may be produced if articles of other forms are produced in accordance with the present invention. For example, the invention is applicable to the production of yarns, fibers and films.

As above stated, after the alcohol is substantially removed from the film by evaporation, the metal salt is washed from the film. To determine the completeness of the removal of calcium chloride the following test may be applied. A portion of the film may be dissolved in formic acid, and silver nitrate added to the solution. If no more precipitate is obtained than is obtained in a corresponding test run with a sample of water containing not to exceed 50 parts per million calcium chloride, the calcium chloride has been adequately removed.

The present invention provides a simple, unique, and practical process for producing transparent synthetic linear polyamide articles. The production of such transparent polyamide articles has long been desired and the present invention makes such desires of the public obtainable. The transparent films of synthetic linear polyamides produced in accordance with the present invention are comparable in strength, elongation, and ultraviolet light transmission to regenerated cellulose film of similar thickness. These polyamide films are superior to regenerated cellulose films in tear resistance, water impermeability and flexibility. Transparent synthetic linear polyamide films produced in accordance with the present invention can be used in the same manner as regenerated cellulose films are used. Thus, they may be used as wrapping materials, decorative sheeting or the like. These films may furthermore be used as photographic films and other related uses. They may also be used in the production of three dimensional transparent articles since these films are capable of cold drawing. For example, they may be formed into cups or the like articles by the use of a drawing punch and die such as the type designed for use in the die stamping of aluminum. These films may also be used in the production of transparent tubing by bringing the edges of the polyamide sheeting together continuously and passing the seam first between hot rolls and then between cold rolls, or over a mandrel, first under a hot roll and then under a cold roll. Such tubing is capable of being oriented by drawing and it is possible to prevent collapsing of the walls of the tubing during the drawing operation by filling the bore with a liquid, such as water, during this operation. Another use to which these films can be put is in the production of artificial lace and the like articles wherein a design is cut in the film by means of a blade or plurality of blades. The cutter may be in the form of a rotary cutter or a stamping die. If desired, the cutter may be heated to produce fusion of the edges of the polyamide film as it is cut.

Since it is obvious that many changes and modifications can be made in the above-described details without departing from the nature and spirit of the invention, it is to be understood that the invention is not to be limited to the details described herein except as set forth in the appended claims.

I claim:

1. The method of producing a transparent article from a metal salt-alcohol solution of a synthetic linear polyamide which comprises dissolving a synthetic linear polyamide having a quench index above 125 mils in a solution taken from the group consisting of metal salt-methanol and metal salt-ethanol solutions, forming an article from said solution, evaporating substantially all the alcohol from said formed article at a rate sufficiently slow to prevent the formation of bubbles therein and before said article comes into contact with moisture in greater concentration than an atmosphere having a relative humidity above 50%, and washing the metal salt from said article with water having a temperature not to exceed 40° C., and drying said article.

2. The method of producing a transparent article from a metal salt-alcohol solution of a synthetic linear polyamide which comprises dissolving a synthetic linear polyamide having a quench index above 125 mils in a calcium chloride-methanol solution, forming an article from said solution, evaporating substantially all the alcohol from said formed article at a rate sufficiently slow to prevent the formation of bubbles therein and before said article comes into contact with moisture in greater concentration than an atmosphere having a relative humidity above 50%, and washing the metal salt from said article with water having a temperature not to exceed 40° C., and drying said article.

3. The method of producing a transparent article from a metal salt-alcohol solution of a synthetic linear polyamide which comprises dissolving a synthetic linear interpolyamide having a quench index above 125 mils in a calcium chloride-methanol solution, forming an article from said solution, evaporating substantially all the alcohol from said formed article at a rate sufficiently slow to prevent the formation of bubbles therein and before said article comes into contact with moisture in greater concentration than an atmosphere having a relative humidity above 50%, and washing the metal salt from said article with water having a temperature not to exceed 40° C., and drying said article.

4. The method of producing a transparent article from a metal salt-alcohol solution of a synthetic linear polyamide which comprises dissolving an interpolymer prepared from hexamethylene diammonium adipate and hexamethylene diammonium sebacate having a quench index above 125 mils in a calcium chloride-methanol solution forming an article from said solution, evaporating substantially all the alcohol from said formed article at a rate sufficiently slow to prevent the formation of bubbles therein and before said article comes into contact with moisture in greater concentration than an atmosphere having a relative humidity above 50%, and washing the metal salt from said article with water having a temperature not to exceed 40° C., and drying said article.

5. The method of producing a transparent article from a metal salt-alcohol solution of a synthetic linear polyamide which comprises dissolving an interpolymer prepared from hexamethylene diammonium adipate and hexamethylene diammonium sebacate in the proportion of 30% of the former to 70% of the latter in a calcium chloride-methanol solution, forming an article from said solution, evaporating substantially all the alcohol from said formed article at a rate sufficiently slow to prevent the formation of bubbles therein and before said article comes into contact with moisture in greater concentration than an atmosphere having a relative humidity above 50%, and washing the metal salt from said article with water having a temperature not to exceed 40° C., and drying said article.

6. The method of producing a transparent film from a metal salt-alcohol solution of a synthetic linear polyamide which comprises dissolving a synthetic linear polyamide having a quench index above 125 mils in a solution taken from the group consisting of metal salt-methanol and metal salt-ethanol solutions, forming a film from said solution, evaporating substantially all the alcohol from said film at a rate sufficiently slow to prevent the formation of bubbles therein and before said film comes into contact with moisture in greater concentration than an atmosphere having a relative humidity above 50%, and washing the metal salt from said film with water having a temperature not to exceed 40° C., and drying said film while maintaining the same under sufficient tension to prevent the formation of wrinkles therein.

7. The method of producing a transparent film from a metal salt-alcohol solution of a synthetic linear polyamide which comprises dissolving a synthetic linear polyamide having a quench index above 125 mils in a calcium chloride-methanol solution, forming a film from said solution, evaporating substantially all the alcohol from said film at a rate sufficiently slow to prevent the formation of bubbles therein and before said film comes into contact with moisture in greater concentration than an atmosphere having a relative humidity above 50%, and washing the metal salt from said film with water having a temperature not to exceed 40° C., and drying said film while maintaining the same under sufficient tension to prevent the formation of wrinkles therein.

8. The method of producing a transparent film from a metal salt-alcohol solution of a synthetic linear polyamide which comprises dissolving a synthetic linear interpolyamide having a quench index above 125 mils in a calcium chloride-methanol solution, forming a film from said solution, evaporating substantially all the alcohol from said film at a rate sufficiently slow to prevent the formation of bubbles therein and before said film comes into contact with moisture in greater concentration than an atmosphere having a relative humidity above 50%, and washing the metal salt from said film with water having a temperature not to exceed 40° C., and drying said film while maintaining the same under sufficient tension to prevent the formation of wrinkles therein.

9. The method of producing a transparent film from a metal salt-alcohol solution of a synthetic linear polyamide which comprises dissolving an interpolymer prepared from hexamethylene diammonium adipate and hexamethylene diammonium sebacate having a quench index above 125 mils in a calcium chloride-methanol solution, forming a film from said solution, evaporating substantially all the alcohol from said film at a rate sufficiently slow to prevent the formation of bubbles therein and before said film comes into contact with moisture in greater concentration than an atmosphere having a relative humidity above 50%, and washing the metal salt from said film with water having a temperature not to exceed 40° C., and drying said film while maintaining the same under sufficient tension to prevent the formation of wrinkles therein.

10. The method of producing a transparent film from a metal salt-alcohol solution of a synthetic linear polyamide which comprises dissolving an interpolymer prepared from hexamethylene diammonium adipate and hexamethylene diammonium sebacate in the proportion of 30% of the former to 70% of the latter in a calcium chloride-methanol solution, forming a film from said solution, evaporating substantially all the alcohol from said film at a rate sufficiently slow to prevent the formation of bubbles therein and before said film comes into contact with moisture in greater concentration than an atmosphere having a relative humidity above 50%, and washing the metal salt from said film with water having a temperature not to exceed 40° C., and drying said film while maintaining the same under sufficient tension to prevent the formation of wrinkles therein.

11. The method of producing a transparent article from a metal salt-alcohol solution of a synthetic linear polyamide which comprises dissolving a synthetic linear polyamide having a quench index above 125 mils in a calcium chloride-ethanol solution, forming an article from said solution, evaporating substantially all the alcohol from said formed article at a rate sufficiently slow to prevent the formation of bubbles therein and before said article comes into contact with moisture in greater concentration than an atmosphere having a relative humidity above 50%, and washing the metal salt from said article with water having a temperature not to exceed 40° C., and drying said article.

12. The method of producing a transparent article from a metal salt-alcohol solution of a synthetic linear polyamide which comprises dissolving a synthetic linear interpolyamide having a quench index above 125 mils in a calcium chloride-ethanol solution, forming an article from said solution, evaporating substantially all the alcohol from said formed article at a rate sufficiently slow to prevent the formation of bubbles therein and before said article comes into contact with moisture in greater concentration than an atmosphere having a relative humidity above 50%, and washing the metal salt from said article with water having a temperature not to exceed 40° C., and drying said article.

13. The method of producing a transparent article from a metal salt-alcohol solution of a synthetic linear polyamide which comprises dissolving an interpolymer prepared from hexamethylene diammonium adipate and hexamethylene diammonium sebacate having a quench index above 125 mils in a calcium chloride-ethanol solution, forming an article from said solution, evaporating substantially all the alcohol from said formed article at a rate sufficiently slow to prevent the formation of bubbles therein and before said article comes into contact with moisture in greater concentration than an atmosphere having a relative humidity above 50%, and washing the metal salt from said article with water having a temperature not to exceed 40° C., and drying said article.

14. The method of producing a transparent article from a metal salt-alcohol solution of a synthetic linear polyamide which comprises dissolving an interpolymer prepared from hexamethylene diammonium adipate and hexamethylene diammonium sebacate in the proportion of 30% of the former to 70% of the latter in a calcium chloride-ethanol solution, forming an article from said solution, evaporating substantially all the alcohol from said formed article at a rate sufficiently slow to prevent the formation of bubbles therein and before said article comes into contact with moisture in greater concentration than an atmosphere having a relative humidity above 50%, and washing the metal salt from said article with water having a temperature not to exceed 40° C., and drying said article.

15. The method of producing a transparent film from a metal salt-alcohol solution of a synthetic linear polyamide which comprises dissolving a synthetic linear polyamide having a quench index above 125 mils in a calcium chloride-ethanol solution, forming a film from said solution, evaporating substantially all the alcohol from said film at a rate sufficiently slow to prevent the formation of bubbles therein and before said film comes into contact with moisture in greater concentration than an atmosphere having a relative humidity above 50%, and washing the metal salt from said film with water having a temperature not to exceed 40° C., and drying said film while maintaining the same under sufficient tension to prevent the formation of wrinkles therein.

16. The method of producing a transparent film from a metal salt-alcohol solution of a synthetic linear polyamide which comprises dissolving a synthetic linear interpolyamide having a quench index above 125 mils in a calcium chloride-ethanol solution, forming a film from said solution, evaporating substantially all the alcohol from said film at a rate sufficiently slow to prevent the formation of bubbles therein and before said film comes into contact with moisture in greater concentration than an atmosphere having a relative humidity above 50%, and washing the metal salt from said film with water having a temperature not to exceed 40° C., and drying said film while maintaining the same under sufficient tension to prevent the formation of wrinkles therein.

17. The method of producing a transparent film from a metal salt-alcohol solution of a synthetic linear polyamide which comprises dissolving an interpolymer prepared from hexamethylene diammonium adipate and hexamethylene diammonium sebacate having a quench index above 125 mils in a calcium chloride-ethanol solution, forming a film from said solution, evaporating substantially all the alcohol from said film at a rate sufficiently slow to prevent the formation of bubbles therein and before said film comes into contact with moisture in greater concentration than an atmosphere having a relative humidity above 50%, and washing the metal salt from said film with water having a temperature not to exceed 40° C., and drying said film while maintaining the same under sufficient tension to prevent the formation of wrinkles therein.

18. The method of producing a transparent film from a metal salt-alcohol solution of a synthetic linear polyamide which comprises dissolving an interpolymer prepared from hexamethylene diammonium adipate and hexamethylene diammonium sebacate in the proportion of 30% of the former to 70% of the latter in a calcium chloride-ethanol solution, forming a film from said solution, evaporating substantially all the alcohol from said film at a rate sufficiently slow to prevent the formation of bubbles therein and before said film comes into contact with moisture in greater concentration than an atmosphere having a relative humidity above 50%, and washing the metal salt from said film with water having a temperature not to exceed 40° C., and drying said film while maintaining the same under sufficient tension to prevent the formation of wrinkles therein.

ORRINGTON EMBRY DWYER.